(12) United States Patent
Reid

(10) Patent No.: US 6,431,054 B1
(45) Date of Patent: Aug. 13, 2002

(54) HOT/COLD INDICATING COFFEE POT DEVICE

(76) Inventor: Benjamin Reid, 700 Bishop St., Suite 800, Honolulu, HI (US) 96813

( * ) Notice: Subject to any disclaimer, the term of this patent is extended or adjusted under 35 U.S.C. 154(b) by 0 days.

(21) Appl. No.: 09/815,706

(22) Filed: Mar. 23, 2001

(51) Int. Cl.⁷ .......................... A47J 31/00; G01K 1/08; G01K 1/14
(52) U.S. Cl. .................. 99/285; 99/323.3; 374/141
(58) Field of Search .................. 99/285, 279, 323.3, 99/275; 220/592.16, 592.17, 62.17; 374/137, 141, 150, 152, 157, 163

(56) References Cited

U.S. PATENT DOCUMENTS

| 4,137,832 A | 2/1979 | Lambros |
| 5,000,581 A | * 3/1991 | Yata et al. ................. 374/150 |
| D320,906 S | 10/1991 | Unger |
| 5,229,751 A | 7/1993 | Chandler et al. |
| 5,678,925 A | 10/1997 | Garmaise et al. |
| 5,680,108 A | 10/1997 | Daniell et al. |
| 5,923,257 A | 7/1999 | Nolte |

* cited by examiner

*Primary Examiner*—Reginald L. Alexander

(57) ABSTRACT

A hot/cold indicating coffee pot device for displaying whether the liquid contained in the coffee pot is either hot or cold. The hot/cold indicating coffee pot device includes a coffee pot including a side wall structure and a handle member being attached to the side wall structure; and also includes a temperature sensor switch being disposed in the coffee pot; and further includes a light-emitting assembly being securely attached to the side wall structure of the coffee pot and being connected to the temperature sensor switch.

10 Claims, 1 Drawing Sheet

HOT/COLD INDICATING COFFEE POT DEVICE

BACKGROUND OF THE INVENTION

1. Field of the Invention

The present invention relates to a coffee pot with hot/cold liquid indicators and more particularly pertains to a new hot/cold indicating coffee pot device for displaying whether the liquid contained in the coffee pot is either hot or cold.

2. Description of the Prior Art

The use of a coffee pot with hot/cold liquid indicators is known in the prior art. More specifically, a coffee pot with hot/cold liquid indicators heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,137,832; 5,229,751; 5,678,925; 5,680,108; 5,923,257; and Des. 320,906.

While these devices fulfill their respective, particular objectives and requirements, the aforementioned patents do not disclose a new hot/cold indicating coffee pot device. The inventive device includes a coffee pot including a side wall structure and a handle member being attached to the side wall structure; and also includes a temperature sensor switch being disposed in the coffee pot; and further includes a light-emitting assembly being securely attached to the side wall structure of the coffee pot and being connected to the temperature sensor switch.

In these respects, the hot/cold indicating coffee pot device according to the present invention substantially departs from the conventional concepts and designs of the prior art, and in so doing provides an apparatus primarily developed for the purpose of displaying whether the liquid contained in the coffee pot is either hot or cold.

SUMMARY OF THE INVENTION

In view of the foregoing disadvantages inherent in the known types of coffee pot with hot/cold liquid indicators now present in the prior art, the present invention provides a new hot/cold indicating coffee pot device construction wherein the same can be utilized for displaying whether the liquid contained in the coffee pot is either hot or cold.

The general purpose of the present invention, which will be described subsequently in greater detail, is to provide a new, hot/cold indicating coffee pot device which has many of the advantages of the coffee pot with hot/cold liquid indicators mentioned heretofore and many novel features that result in a new hot/cold indicating coffee pot device which is not anticipated, rendered obvious, suggested, or even implied by any of the prior art coffee pot with hot/cold liquid indicators, either alone or in any combination thereof.

To attain this, the present invention generally comprises a coffee pot including a side wall structure and a handle member being attached to the side wall structure; and also includes a temperature sensor switch being disposed in the coffee pot; and further includes a light-emitting assembly being securely attached to the side wall structure of the coffee pot and being connected to the temperature sensor switch.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new hot/cold indicating coffee pot device which has many of the advantages of the coffee pot with hot/cold liquid indicators mentioned heretofore and many novel features that result in a new hot/cold indicating coffee pot device which is not anticipated, rendered obvious, suggested, or even implied by any of the prior art coffee pot with hot/cold liquid indicators, either alone or in any combination thereof.

It is another object of the present invention to provide a new hot/cold indicating coffee pot device which may be easily and efficiently manufactured and marketed.

It is a further object of the present invention to provide a new hot/cold indicating coffee pot device which is of a durable and reliable construction.

An even further object of the present invention is to provide a new hot/cold indicating coffee pot device which is susceptible of a low cost of manufacture with regard to both materials and labor, and which accordingly is then susceptible of low prices of sale to the consuming public, thereby making such hot/cold indicating coffee pot device economically available to the buying public.

Still yet another object of the present invention is to provide a new hot/cold indicating coffee pot device which provides in the apparatuses and methods of the prior art some of the advantages thereof, while simultaneously overcoming some of the disadvantages normally associated therewith.

Still another object of the present invention is to provide a new hot/cold indicating coffee pot device for displaying whether the liquid contained in the coffee pot is either hot or cold.

Yet another object of the present invention is to provide a new hot/cold indicating coffee pot device which includes a coffee pot including a side wall structure and a handle member being attached to the side wall structure; and also includes a temperature sensor switch being disposed in the coffee pot; and further includes a light-emitting assembly being securely attached to the side wall structure of the coffee pot and being connected to the temperature sensor switch.

Still yet another object of the present invention is to provide a new hot/cold indicating coffee pot device that quickly and effectively identifies whether the liquid contained in the coffee pot is either hot or cold.

Even still another object of the present invention is to provide a new hot/cold indicating coffee pot device that ensures that hot coffee is being served to the user.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
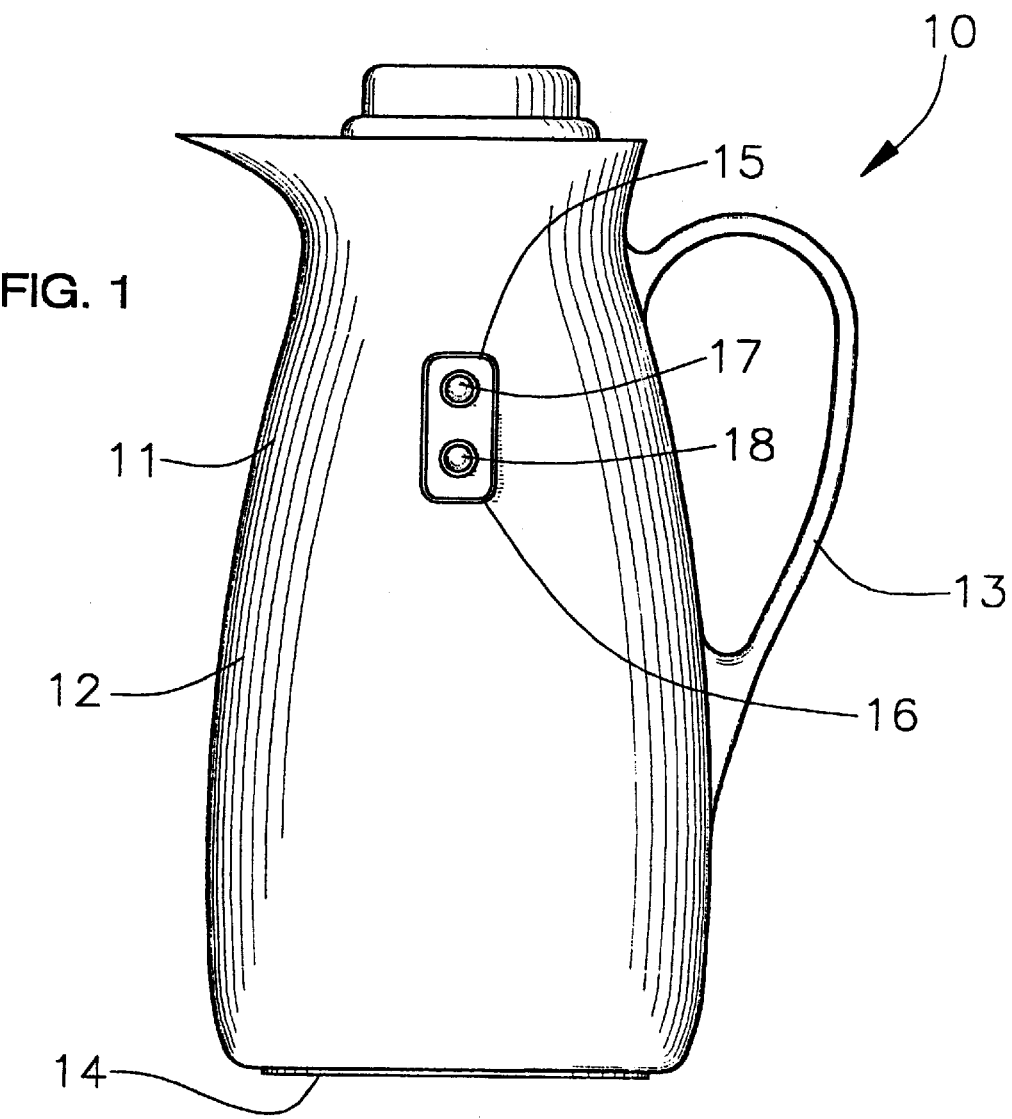
FIG. 1 is a side elevational view of a new hot/cold indicating coffee pot device according to the present invention.
Figure 2:
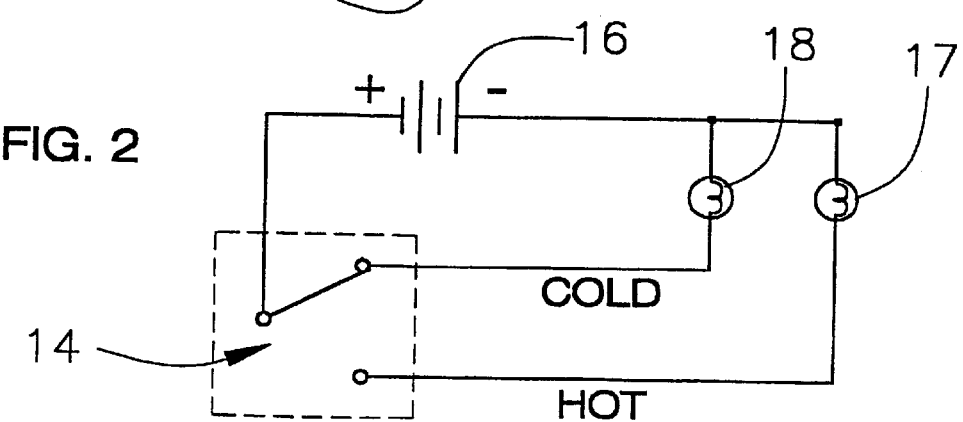
FIG. 2 is a schematic diagram of the present invention.

With reference now to the drawings, and in particular to FIGS. 1 through 2 thereof, a new hot/cold indicating coffee pot device embodying the principles and concepts of the present invention and generally designated by the reference numeral 10 will be described.

As best illustrated in FIGS. 1 through 2, the hot/cold indicating coffee pot device 10 generally comprises a coffee pot 11 including a side wall structure 12 and a handle member 13 conventionally attached to the side wall structure 12. A temperature sensor switch 14 is conventionally disposed in the coffee pot 11. The temperature sensor switch 14 is conventionally disposed in a base wall of the coffee pot 11 and is adapted to either sense heat or cold emitted from liquid contained in the coffee pot A light-emitting assembly is securely and conventionally attached to the side wall structure 12 of the coffee pot 11 and is conventionally connected to the temperature sensor switch 14. The light-emitting assembly includes a plate-like support member 15 being securely and conventionally attached upon the side wall structure 12 of the coffee pot 11, and also includes a first light-emitting member 17 being securely and conventionally mounted to the plate-like support member 15 and being conventionally connected to the temperature sensor switch 14, and further includes a second light-emitting member 18 being conventionally connected to the temperature sensor switch 14, and also includes a power source 16 such as a battery pack being removably and conventionally attached to the plate-like support member 15 and being conventionally connected to the first and second light-emitting members 17,18. The first light-emitting member 17 is energized and displays a red light upon the temperature sensor switch 14 sensing that the liquid in the coffee pot 11 is hot. The second light-emitting member 18 is energized and displays a blue light upon the temperature sensor switch 14 sensing that the liquid in the coffee pot 11 is cold.

In use, the user fills the coffee pot 11 with suitable liquid, and if the liquid is hot, the first light-emitting member 17 will display a red light, and if the liquid is cold, the second light-emitting member 18 will display a blue light.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hot/cold indicating coffee pot device comprising:
   a coffee pot including a side wall structure and a handle member attached to said side wall structure;
   a temperature sensor switch being disposed in said coffee pot; and
   a light-emitting assembly being attached to said side wall structure of said coffee pot and being connected to said temperature sensor switch;
   wherein said light-emitting assembly includes a support member attached upon said side wall structure of said coffee pot, a first light-emitting member mounted to said support member and being connected to said temperature sensor switch, a second light-emitting member being connected to said temperature sensor switch, and a power source being removably attached to said support member and being connected to said first and second light-emitting members.

2. A hot/cold indicating coffee pot device as described in claim 1, wherein said temperature sensor switch is disposed in a wall of said coffee pot and is adapted to either sense heat or cold emitted from liquid contained in said coffee pot.

3. A hot/cold indicating coffee pot device as described in claim 1, wherein said first light-emitting member is energized upon said temperature sensor switch sensing that the liquid in said coffee pot is hot.

4. A hot/cold indicating coffee pot device as described in claim 1, wherein said first light-emitting member displays a red light when said temperature sensor switch sensing that the liquid in said coffee pot is hot.

5. A hot/cold indicating coffee pot device as described in claim 1, wherein said second light-emitting member is energized upon said temperature sensor switch sensing that the liquid in said coffee pot is cold.

6. A hot/cold indicating coffee pot device as described in claim 1, wherein said first light-emitting member displays a blue light when said temperature sensor switch sensing that the liquid in said coffee pot is hot.

7. A hot/cold indicating coffee pot device comprising:
a coffee pot including a side wall structure and a handle member attached to said side wall structure;
a temperature sensor switch being disposed in said coffee pot; and
a light-emitting assembly being securely attached to said side wall structure of said coffee pot and being connected to said temperature sensor switch;
wherein said temperature sensor switch is disposed in a base wall of said coffee pot and is adapted to either sense heat or cold emitted from liquid contained in said coffee pot;
wherein said light-emitting assembly includes a support member being securely attached upon said side wall structure of said coffee pot, and also includes a first light-emitting member being securely mounted to said support member and being connected to said temperature sensor switch, and further includes a second light-emitting member being connected to said temperature sensor switch, and also includes a power source being removably attached to said support member and being connected to said first and second light-emitting members.

8. A hot/cold indicating coffee pot device as described in claim 7, wherein said first light-emitting member is energized and displays a red light upon said temperature sensor switch sensing that the liquid in said coffee pot is hot.

9. A hot/cold indicating coffee pot device as described in claim 7, wherein said second light-emitting member is energized and displays a blue light upon said temperature sensor switch sensing that the liquid in said coffee pot is cold.

10. A hot/cold indicating coffee pot device comprising:
a coffee pot including a side wall structure and a handle member attached to said side wall structure;
a temperature sensor switch being disposed in said coffee pot, said temperature sensor switch being disposed in a base wall of said coffee pot and being adapted to either sense heat or cold emitted from liquid contained in said coffee pot; and
a light-emitting assembly being securely attached to said side wall structure of said coffee pot and being connected to said temperature sensor switch, said light-emitting assembly including a support member being securely attached upon said side wall structure of said coffee pot, and also including a first light-emitting member being securely mounted to said support member and being connected to said temperature sensor switch, and further including a second light-emitting member being connected to said temperature sensor switch, and also including a power source being removably attached to said support member and being connected to said first and second light-emitting members, said first light-emitting member being energized and displaying a red light upon said temperature sensor switch sensing that the liquid in said coffee pot is hot, said second light-emitting member being energized and displaying a blue light upon said temperature sensor switch sensing that the liquid in said coffee pot is cold.

* * * * *